United States Patent
Ong et al.

(10) Patent No.: US 7,889,706 B2
(45) Date of Patent: Feb. 15, 2011

(54) APPARATUS AND METHOD FOR DETECTING PILOT SIGNAL IN MOBILE COMMUNICATION SYSTEM

(75) Inventors: Sung-Hwan Ong, Seoul (KR); Sung-Kwon Jo, Suwon-si (KR); Ji-Won Lee, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 941 days.

(21) Appl. No.: 11/236,564

(22) Filed: Sep. 28, 2005

(65) Prior Publication Data

US 2006/0067292 A1   Mar. 30, 2006

(30) Foreign Application Priority Data

Sep. 30, 2004   (KR) .................... 10-2004-0078021

(51) Int. Cl.
*H04B 7/216* (2006.01)
(52) U.S. Cl. .................. 370/342; 455/67.11; 455/226.1
(58) Field of Classification Search ................ 370/342; 455/67.11, 226.1
See application file for complete search history.

(56) References Cited

U.S. PATENT DOCUMENTS

| | | | | |
|---|---|---|---|---|
| 6,151,328 A | * | 11/2000 | Kwon et al. ................. 370/441 |
| 7,088,957 B2 | * | 8/2006 | Ling et al. ................ 455/67.11 |
| 7,161,973 B2 | * | 1/2007 | Ghosh ........................ 375/147 |
| 7,170,923 B2 | * | 1/2007 | Yeo et al. .................... 375/147 |
| 7,200,127 B1 | * | 4/2007 | Lee et al. .................... 370/335 |
| 2006/0034352 A1 | * | 2/2006 | Sampath et al. ............. 375/148 |

* cited by examiner

*Primary Examiner*—Temica M Beamer
(74) *Attorney, Agent, or Firm*—Roylance, Abrams, Berdo & Goodman, L.L.P.

(57) ABSTRACT

An apparatus and method for detecting a pilot signal in a mobile communication system are provided by which the processing time taken to demodulate a traffic channel based on a channel estimation result can be reduced, and thus, the size of a buffer for buffering signals until the presence of a secondary/auxiliary pilot signal is detected can also be reduced. The apparatus includes a first channel estimator for estimating a channel for a noise component of a pilot symbol received by a first receiver, a second channel estimator for adding a pilot symbol received by a second receiver and the pilot symbol received by the first receiver and estimating a channel for a noise component of the added pilot symbol, an energy detector for detecting an energy value of a pilot symbol using result values output from the first and second channel estimators, and a comparison and determination unit for determining whether or not there is a secondary/auxiliary pilot signal by using the detected energy values.

20 Claims, 3 Drawing Sheets

APPARATUS AND METHOD FOR DETECTING PILOT SIGNAL IN MOBILE COMMUNICATION SYSTEM

CROSS-REFERENCE TO RELATED APPLICATIONS

This application claims the benefit under 35 U.S.C. §119 (a) of Korean Patent Application No. 10-2004-0078021 entitled "APPARATUS AND METHOD FOR DETECTING PILOT SIGNAL IN MOBILE COMMUNICATION SYSTEM" filed in the Korean Intellectual Property Office on Sep. 30, 2004, the entire disclosure of which is incorporated herein by reference.

BACKGROUND OF THE INVENTION

1. Field of the Invention

The present invention relates to an apparatus and method for detecting a pilot signal in a mobile communication system. More particularly, the present invention relates to an apparatus and method for detecting a pilot signal in a mobile communication system that are capable of detecting whether a secondary/auxiliary pilot signal is transmitted in a mobile communication system based on the CDMA 2000 standard.

2. Description of the Related Art

In general, in order to perform communication in a mobile communication system, a channel is established and data is transmitted and received over the channel. Such a channel should be configured to have a different transmission power depending on a position of a mobile terminal with respect to a base station. That is, a mobile terminal far from a base station should transmit data at higher power than a mobile terminal near the base station, such that the base station can normally receive the data.

As such, control of transfer power from the base station to the mobile terminal is referred to as forward link power control. Conversely, control of transfer power from the mobile terminal to the base station is referred to as reverse link power control.

The base station can control reverse link power only when it knows a state of the channel through which data is received from the mobile terminal. That is, in order to perform synchronization detection, it is necessary to know a state of the channel through which received signals have passed. Information on such a channel state can be provided through a pilot channel.

However, a general mobile communication system performs only forward link power control.

Accordingly, the CDMA 2000 standard, which is currently adopted as a synchronous IMT 2000 system standard, uses the pilot signal even in the reverse link. Accordingly, the base station can perform synchronization detection, and thus, reverse link data transmission can be smoothly performed and system capacity can be improved.

The channel state is detected in a channel estimator using data transmitted through the pilot channel, and a signal distortion level is estimated through the channel estimation. Further, information distortion can be reduced by applying the estimation value to received information bit correction.

In the CDMA 2000 standard, high-speed data transmission is supported through a reverse traffic channel, and a primary pilot together with a secondary/auxiliary pilot is transmitted in order to increase the efficiency of power control and channel estimation.

The secondary/auxiliary pilot in the CDMA 2000 standard is characterized in that when transmitting data at high speed, it transmits data with greater power than the primary pilot in order to increase channel estimation efficiency.

The secondary/auxiliary pilot is not always transmitted but rather is discontinuously transmitted depending on a data transmission rate of traffic to be transmitted from a transmitter.

Channel estimation is performed using only the primary pilot signal when there is only a primary pilot signal, and is performed using a combined signal of the primary pilot signal and secondary/auxiliary pilot signal when there is a secondary/auxiliary pilot signal.

Accordingly, only when it is correctly determined whether the secondary/auxiliary pilot signal is present can channel estimation performance be improved by enhancing a signal to noise ratio of an input signal used in the channel estimation.

Generally, a receiver determines whether the secondary/auxiliary pilot signal is present or not by observing energy (or power) of the secondary/auxiliary pilot signal for a predetermined time interval. Since channel estimation is performed after determining whether the secondary/auxiliary pilot signal is present or not, the traffic channel signals should be stored in a buffer until a determination is made.

Below, a conventional secondary/auxiliary pilot signal detection apparatus of a mobile communication system will now be described with reference to FIG. 1.

FIG. 1 is a schematic block diagram of a conventional pilot signal detection apparatus.

Referring to FIG. 1, the pilot signal detection apparatus comprises an accumulator 10, an energy detector 11, and a comparison and determination unit 12.

When a signal transmitted from a transmitter passes through a mobile channel environment and is received in the form of a pilot symbol to which a noise component is added, the accumulator 10 accumulates the received pilot symbols for a predetermined time interval and then provides them to the energy detector 11.

The energy detector 11 detects an energy value for the pilot symbols provided from the accumulator 10 and provides the detected energy value to the comparison and determination unit 12.

The comparison and determination unit 12 compares the energy value for the pilot symbols provided from the energy detector 11 with an established threshold value, and then determines whether the secondary/auxiliary pilot signal is present based on the comparison results.

Operation of a secondary/auxiliary pilot signal detection apparatus having such a configuration will now be briefly explained.

First, a signal symbol transmitted from the transmitter passes through a mobile channel environment and is received in a receiver together with an additional noise component. Such received signals are accumulated in the accumulator 10 for a predetermined time interval and then provided to the energy detector 11.

The energy detector 11 detects the energy of the symbols provided from the accumulator 10. When there is no secondary/auxiliary pilot signal, the measured energy $E_{aux}$ is given by Equation (1) below:

$$E_{aux} = n_{aux} \qquad \text{[Equation 1]}$$

wherein $n_{aux}$ is a noise component.

In contrast, when there is a secondary/auxiliary pilot signal, the measured energy $E_{aux}$ is given by Equation (2) below:

$$E_{aux} = P_{aux} + n_{aux} \qquad \text{[Equation 1]}$$

wherein $P_{aux}$ is the secondary/auxiliary pilot signal and $n_{aux}$ is a noise component.

When detecting energy given by Equations (1) and (2), the detected energy is used to determine whether the secondary/auxiliary pilot signal is present or not in the comparison and determination unit 12 using Equation (3) below:

$$\text{Decision} = E_{aux} > TH \qquad \text{[Equation 3]}$$

That is, it is determined that the secondary/auxiliary pilot signal is present in the received signal when the energy value detected in the energy detector 11 is greater than an established threshold value TH, and it is determined that the secondary/auxiliary pilot signal is not present in the received signal when the energy value detected in the energy detector 11 is smaller than the threshold value TH.

Here, the threshold value TH is a boundary value determined in consideration of a distribution of a noise signal and the secondary/auxiliary pilot signal.

As such, in order to reliably gauge whether the secondary/auxiliary pilot signal is present or not in the manner described above, observation for a predetermined time interval is required. However, since channel estimation is performed after it is determined whether the secondary/auxiliary pilot signal is present or not, the traffic channel signals should be stored in the buffer until a determination is made. Therefore, as the time interval for measuring energy increases, the amount of data to be stored increases and process delay times also increase.

Accordingly, a need exists for a system and method for reducing detection delay times in a receiver, thereby also reducing the size of buffers for storing traffic channel signals.

SUMMARY OF THE INVENTION

It is an objective of the present invention to substantially solve the above and other problems, and provide an apparatus and method for detecting a pilot signal in a mobile communication system by which, when detecting a secondary/auxiliary pilot signal in a mobile communication system based on the CDMA 2000 standard, a secondary/auxiliary pilot signal detection delay time in a receiver and the size of a buffer for storing traffic channel signals can be reduced.

According to an aspect of the present invention, an apparatus for detecting a pilot signal in a mobile communication system is provided, comprising a channel estimator for estimating a channel for a pilot symbol received from a receiver, an energy detector for detecting energy of a pilot symbol using a channel estimation result value output from the channel estimator, and a comparison and determination unit for determining whether a secondary/auxiliary pilot signal is present in the received pilot symbol based on the detected energy value.

The apparatus of the present invention may further comprise a combination unit for combining energy values in each finger detected from the energy detector and providing the combined value to the comparison and determination unit.

The comparison and determination unit may determine that the secondary/auxiliary pilot signal is present when the energy value output from the combination unit is greater than an established threshold value, and that the secondary/auxiliary pilot signal is not present when the energy value is less than the established threshold value.

The established threshold value may be decided by considering a power ratio and a noise component distribution of the secondary/auxiliary pilot signal and a primary pilot signal.

According to another aspect of the present invention, an apparatus for detecting a pilot signal in a mobile communication system is provided, comprising a first channel estimator for estimating a channel for a noise component of a pilot symbol received by a first receiver, a second channel estimator for estimating a channel for a pilot symbol received by a second receiver, a first energy detector for detecting an energy value for the pilot symbol using a result value output from the first channel estimator, a second energy detector for detecting an energy value for the pilot symbol using a result value output from the second channel estimator, and a comparison and determination unit for determining whether a secondary/auxiliary pilot signal is present or not using energy values detected from the first and second energy detectors.

The second channel estimator may comprise an adder for adding the pilot symbol received from the second receiver and the pilot symbol received from the first receiver.

The energy detectors may comprise the first energy detector for detecting energy in each finger for a symbol output from the first channel estimator, and the second energy detector for detecting energy in each finger for a symbol output from the second channel estimator.

The energy detectors may further comprise a first combination unit for combining energy values in each finger detected by the first energy detector, and a second combination unit for combining energy values in each finger detected by the second energy detector.

The energy detectors may still further comprise a multiplier for multiplying an energy value detected by the first energy detector by an arbitrary coefficient so as to be equal in distribution to an energy value detected by the second energy detector.

According to yet another aspect of the present invention, a method for detecting a pilot signal in a mobile communication system is provided, comprising the steps of estimating a channel for a pilot symbol received from a receiver, detecting energy of the pilot symbol using a channel estimation result value, and determining whether a secondary/auxiliary pilot signal is present or not in the pilot symbol received based on a detected energy value.

The method of the present invention may further comprise the step of combining energy values in each finger detected in the energy detection step.

According to yet another aspect of the present invention, a method for detecting a pilot signal in a mobile communication system is provided, comprising the steps of estimating a first channel for a pilot symbol received by a first receiver and a second channel for a pilot symbol received by a second receiver, detecting a first energy value for the pilot symbol using a result value of the first channel estimation and a second energy value for the pilot symbol using a result value of the second channel estimation, and determining whether the secondary/auxiliary pilot signal is present or not using each energy value detected.

The second channel estimation step may comprise the sub-step of adding the pilot symbol received from the second receiver and the pilot symbol received from the first receiver.

The energy value detection step may comprise the sub-step of detecting energy values in each finger for symbols estimated from the first and second channels.

The energy value detection step may further comprise the sub-step of combining the energy values in each finger for the symbols of the first and second channels in each channel.

The energy value detection step may still further comprise the sub-step of multiplying the detected first energy value by an arbitrary coefficient so as to be equal in distribution to the detected second energy value.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF THE EXEMPLARY EMBODIMENTS

The present invention will now be described more fully hereinafter with reference to the accompanying drawings, in which an exemplary embodiment of the present invention is shown. The present invention may, however, be embodied in different forms and embodiments, and should not be construed as limited to the exemplary embodiments set forth herein. Rather, the exemplary embodiment is provided so that this disclosure will be thorough and complete, and will fully convey the scope of the present invention to those skilled in the art.

Figure 1:
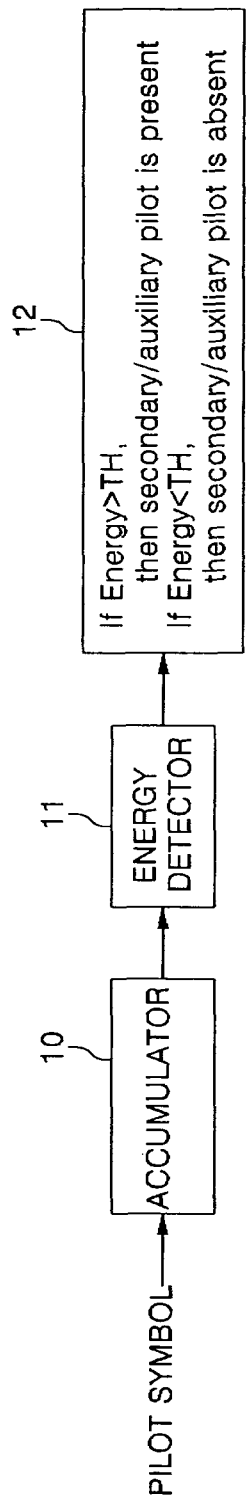
FIG. 1 is a block diagram of a conventional pilot signal detection apparatus.
Figure 2:
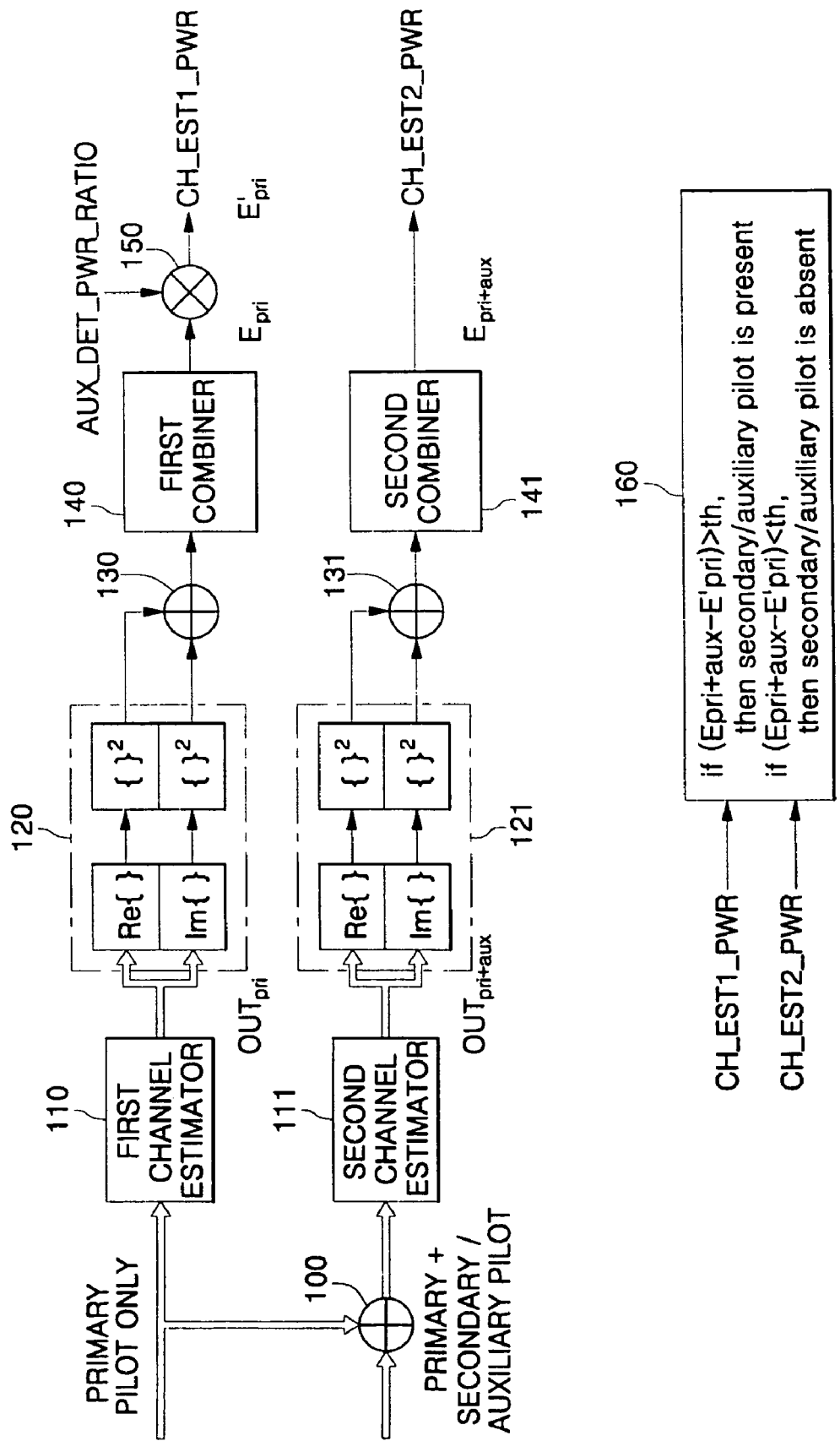
FIG. 2 is a block diagram of a pilot signal detection apparatus of a mobile communication system in accordance with an embodiment of the present invention.

FIG. 2 is a block diagram of a pilot signal detection apparatus of a mobile communication system in accordance with an embodiment of the present invention.

Referring to FIG. 2, a pilot signal detection apparatus comprises first and second channel estimators 110 and 111, first and second energy detectors 120 and 121, first, second, and third adders 100, 130, and 131, first and second combination units 140 and 141, a multiplier 150, and a comparison and determination unit 160.

The first channel estimator 110 estimates a channel of a primary symbol received in a first receiver and provides the first energy detector 120 with the channel.

The first adder 100 adds the primary pilot symbol received in the first receiver and a secondary/auxiliary symbol input into a second receiver and provides the resulting added symbol to the second channel estimator 111.

Here, when the symbol input into the first channel estimator 110 and the symbol input into the second channel estimator 111 are denoted by x and y, respectively, Equations (4) and (5) below hold that:

$$x = P_{pri} + n \quad \text{[Equation 4]}$$

$y = P_{pri} + n_{pri} + P_{aux} + n_{aux}$: when the secondary/auxiliary pilot is present $y = P_{pri} + n_{pri} + n_{aux}$: when the secondary/auxiliary pilot is not present  [Equation 5]

Here, $P_{pri}$ denotes the received primary pilot symbol, $P_{aux}$ denotes the received secondary/auxiliary pilot symbol, and n denotes a noise symbol.

When such signals are input into the first channel estimator 110 and second channel estimator 111, respectively, the first and second channel estimators 110 and 111 estimate channels for input symbols and provide the channels to the first and second energy detectors 120 and 121.

Here, values estimated in the first and second channel estimators 110 and 111, that is, output values $\text{Out}_{pri}$, $\text{Out}_{pri+aux}$ of the first and second channel estimators 110 and 111, can be expressed as Equations (6) and (7) below:

$$OUT_{pri} = fn_{chest1}(x) \quad \text{[Equation 6]}$$

$$OUT_{pri+aux} = fn_{chest2}(y) \quad \text{[Equation 7]}$$

Here, $f_{chest1}$ and $f_{chest2}$ denote first and second channel estimation functions, which can each be expressed as a sum of linear functions.

$$OUT_{pri} = fn_{chest1}(P_{pri} + n_{pri}) = fn_{chest1}(P_{pri}) + fn_{chest1}(n_{pri})$$

$$OUT_{pri+aux} = fn_{chest1}(P_{pri} + n_{pri} + P_{aux} + n_{aux}) \quad \text{[Equation 9]}$$

$$= fn_{chest1}(P_{pri}) + fn_{chest1}(n_{pri}) +$$

$$fn_{chest1}(P_{aux}) + fn_{chest1}(n_{aux})$$

: when the secondary/auxiliary pilot is present $$OUT_{pri+aux} = fn_{chest2}(P_{pri} + n_{pri} + P_{aux} + n_{aux}) \quad \text{[Equation 10]}$$

$$= fn_{chest2}(P_{pri}) + fn_{chest2}(n_{pri}) +$$

$$fn_{chest2}(P_{aux}) + fn_{chest2}(n_{aux})$$

: when the secondary/auxiliary pilot is not present

Here, since the signals output from the first and second channel estimators 110 and 111 have complex numerical values as shown in Equations (9) and (10), channel estimation values output from the first and second channel estimators 110 and 111 are provided to the first and second energy detectors 120 and 121, respectively.

The first and second energy detectors 120 and 121 detect the values output from the first and second channel estimators 110 and 111 as real and imaginary energy (or power) values, respectively.

The real and imaginary energy values obtained in the first and second energy detectors 120 and 121 are provided to the first and second adders 130 and 131, respectively, and the added energy values are provided to the first and second combination units 140 and 141, respectively.

Although only one finger is shown in FIG. 2, the first and second combination units 140 and 141 combine energy values input from respective fingers, that is, energy values input from energy detectors (not shown) of a plurality of fingers in a predetermined time interval.

Here, the result of combining energy values in the first and second combination units 140 and 141 can be expressed by Equations (11) and (12) below:

$$E_{pri} = \sum_{f=0}^{F-1} |fn_{chest1}(P_{pri,f})|^2 + |fn_{chest1}(n_{pri,f})|^2 \quad \text{[Equation 11]}$$

-continued $$E_{pri+aux} = \begin{cases} \text{when secondary/auxiliary} \\ \quad \text{pilot exists} \\ \sum_{f=0}^{F-1} \{|fn_{chest2}(P_{pri,f})|^2 + \\ \quad |fn_{chest2}(P_{aux,f})|^2 + \\ 2 \cdot |fn_{chest2}(P_{pri,f})| \cdot |fn_{chest2}(P_{aux,f})| + \\ \quad |fn_{chest2}(n_{pri,f})|^2 + |fn_{chest2}(n_{aux,f})|^2\} \\ \text{when secondary/auxiliary} \\ \quad \text{pilot does not exist} \\ \sum_{f=0}^{F-1} |fn_{chest2}(P_{pri,f})|^2 + \\ \quad |fn_{chest2}(n_{pri,f})|^2 + \\ \quad |fn_{chest2}(n_{aux,f})|^2 \end{cases}$$ [Equation 12]

Here, the subscript f denotes the finger.

Although the output of the first channel estimator 110 is expressed as Equation (11) regardless of whether or not the secondary/auxiliary pilot is present, the output of the second channel estimator 111 is expressed differently depending on whether or not the secondary/auxiliary pilot is present.

Further, the multiplier 150 multiplies the combined energy output from the first combination unit 140 by an arbitrary value, that is, multiplies Equation (11) by a value of AUX_DET_PWR_RATIO so as to make the energy of the noise signal in Equation (11) substantially the same as the energy of the noise signal in Equation (12). Here, the value output from the multiplier 150 can be expressed as Equation (13) below:

$$E'_{pri} = \text{AUX\_DET\_PWR\_RATIO} \times E_{pri}$$ [Equation 13]

$$= \text{AUX\_DET\_PWR\_RATIO} \times$$

$$\sum_{f=0}^{F-1} |fn_{chest1}(P_{pri,f})|^2 +$$

$$\text{AUX\_DET\_PWR\_RATIO} \times$$

$$\sum_{f=0}^{F-1} |fn_{chest1}(n_{pri,f})|^2$$

Using values (CH_EST1_PWR) and (CH_EST2_PWR) obtained from Equations (12) and (13), the comparison and determination unit 160 determines whether the pilot signal is present or not.

That is, while the presence of the pilot signal is determined by applying the value output from Equations (12) and (13) to Equation (14), a value output from the multiplier 150 and a value output from the second combination unit 141 are each compared with an established threshold value and the presence of the secondary/auxiliary pilot signal is determined from the comparison result.

As a result, in order for the comparison and determination unit 160 to determine whether the secondary/auxiliary pilot signal is present or not, a decision matrix value is produced using Equation (14) below.

It is determined that the secondary/auxiliary pilot signal is not present when the produced energy value is smaller than the established threshold value TH, and that the secondary/auxiliary pilot signal is present when the produced energy value is greater than the established threshold value TH.

$$\text{Decision Matrix} = E_{pri+aux} - E'_{pri}$$ [Equation 14]

Here, $E_{pri+aux}$ is an energy value output from the secondary combination unit 141, and $E'_{pri}$ is an energy value output from the multiplier 150.

The case where the secondary/auxiliary pilot signal is present and the case where the secondary/auxiliary pilot signal is not present, can be expressed as Equation (15) below:

$$\frac{\text{decision}}{\text{matrix}} = E_{pri+aux} - E'_{pri}$$ [Equation 15]

$$= \begin{cases} \text{when secondary/auxiliary} \\ \quad \text{pilot exists} \\ \sum_{f=0}^{F-1} |fn_{chest2}(P_{aux,f})|^2 - \\ (\text{AUX\_DET\_PWR\_RATIO} - 1) \times \\ \sum_{f=0}^{F-1} |fn_{chest2}(P_{pri,f})|^2 + \\ \sum_{f=0}^{F-1} 2 \cdot |fn_{chest2}(P_{aux,f})| \cdot |fn_{chest2}(P_{pri,f})| \\ \text{when secondary/auxiliary} \\ \quad \text{pilot does not exist} \\ \sum_{f=0}^{F-1} |fn_{chest2}(P_{pri,f})|^2 - \\ \text{AUX\_DET\_PWR\_RATIO} \times \\ \sum_{f=0}^{F-1} |fn_{chest2}(P_{pri,f})|^2 \end{cases}$$

As a result, the comparison and determination unit 160 compares and determines whether or not the energy value $E_{pri+aux}$ output from the second combination unit 141 minus the energy value $E'_{pri}$ output from the multiplier 150 is greater than the established threshold value. It is then determined that the secondary/auxiliary pilot signal is present when the decision matrix value in Equation (14) is greater than the threshold value TH, and that the secondary/auxiliary pilot signal is not present otherwise.

The threshold value TH is determined by considering a power ratio of the secondary/auxiliary pilot signal to the primary pilot signal and a noise distribution.

A secondary/auxiliary pilot signal detection method in accordance with an embodiment of the present invention corresponding to the operation of the above pilot signal detection apparatus in the mobile communication system, will now be described step by step with reference to FIG. 3.

Figure 3:
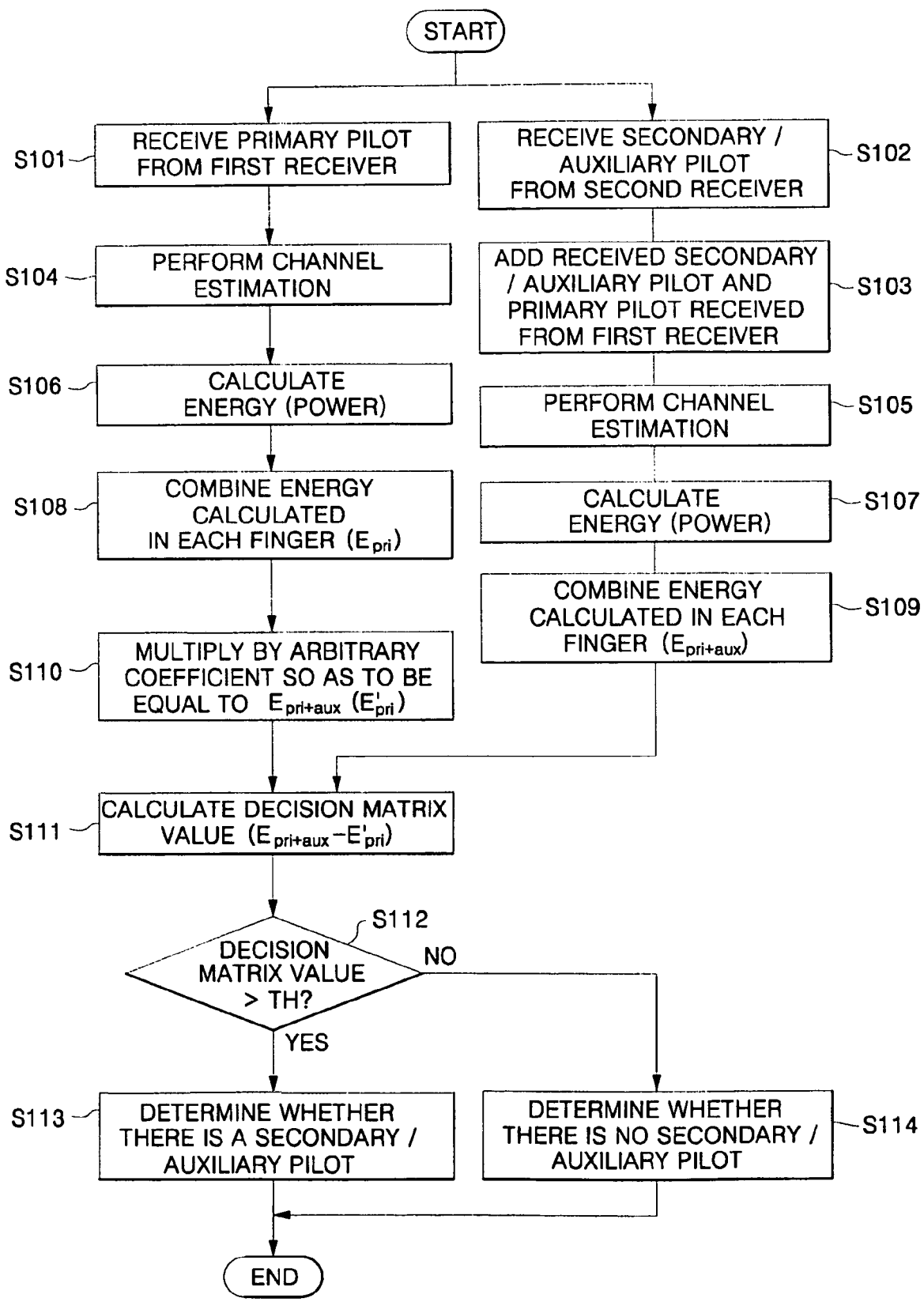
FIG. 3 is a flowchart illustrating a secondary/auxiliary pilot signal detection method in a mobile communication system in accordance with an embodiment of the present invention.

FIG. 3 is an operational flowchart illustrating a secondary/auxiliary pilot signal detection method in a mobile communication system in accordance with an embodiment of the present invention.

Referring to FIG. 3, first, the primary pilot signal is received from the first receiver at step (S101) and the secondary/auxiliary pilot signal is received from the second receiver at step (S102).

Next, the secondary/auxiliary pilot symbol received from the second receiver is added to the primary pilot symbol received from the first receiver at step (S103).

Channel estimation is performed for noise in the primary pilot symbol received in step (S101) at step (S104), and is performed for noise in the added symbol of the primary pilot symbol and secondary/auxiliary pilot symbol at step (S105).

At this time, symbols x and y that are input for channel estimation can be expressed as Equations (4) and (5) above.

Further, results of the channel estimation performed in the steps (S104) and (S105) can be expressed as Equations (6) and (7), and in more detail, as Equations (8) and (9).

After performing channel estimation in steps (S104) and (S105), energy (or power) for each case is calculated at steps (S106) and (S107).

The calculated energy value is for one finger, and energy values calculated for each finger are combined at steps (S108) and (S109). Here, the energy value $E_{pri}$ combined in step (S108) is the same as in Equation (II), and the energy value $E_{pri+aux}$ combined in step (S109) is expressed as Equation (12).

The energy value for the primary pilot symbol calculated in step (S108) is multiplied by an arbitrary coefficient in step (S110) to be substantially the same as the energy value produced in step (S109), that is, $E_{pri+aux}$, so that the $E'_{pri+aux}$ value is obtained. Here, $E'_{pri+aux}$ can be expressed as Equation (13).

A decision matrix value for determining whether the secondary/auxiliary pilot symbol is present or not is produced using the energy values calculated in steps (S109) and (S110), that is, $E_{pri+aux}$ and $E_{pri+aux}$ at step (S111). Here, the decision matrix can be produced using Equation (14).

Subsequently, the decision matrix value produced in step (S111) is compared with the established threshold value TH at step (S112).

When the produced decision matrix value is greater than the established threshold value, it is determined that the secondary/auxiliary pilot signal is present in the received pilot symbol at step (S113). Otherwise, when the produced decision matrix value is less than the established threshold value TH, it is determined that the secondary/auxiliary pilot signal is not present in the received pilot symbol at step (S114).

Here, the established threshold value is determined by considering a power ratio and a noise distribution of the secondary/auxiliary pilot signal and primary pilot signal.

In the apparatus and method for detecting a pilot signal in the mobile communication system according to embodiments of the present invention, it is possible to determine whether or not the secondary/auxiliary pilot signal is present at each output period of the channel estimator, such that the output period of the channel estimator becomes shorter than a detection period of a conventional secondary/auxiliary pilot energy detector while having reliable detection performance. Accordingly, processing time taken to demodulate the traffic channel based on a channel estimation result can be reduced, and thus, the size of a buffer for storing signals until the presence of a secondary/auxiliary pilot signal is determined can be reduced as well.

While the present invention has been described with reference to exemplary embodiments thereof, it will be understood by those skilled in the art that various changes in form and detail may be made therein without departing from the scope of the present invention as defined by the following claims.

What is claimed is:

1. An apparatus for detecting a pilot signal in a mobile communication system, comprising:
    a first channel estimator for estimating a channel for a first pilot symbol;
    a second channel estimator for estimating a channel for a second pilot symbol;
    a first energy detector for detecting an energy value for the first pilot symbol using a result from the first channel estimator;
    a second energy detector for detecting an energy value for the second pilot symbol using a result from the second channel estimator; and
    a determination unit for determining whether a secondary/auxiliary pilot signal is present using energy values detected from the first and second energy detectors.

2. The apparatus according to claim 1, wherein the first pilot symbol is a primary pilot signal, and the second pilot symbol is a secondary/auxiliary pilot signal.

3. The apparatus according to claim 1, wherein the second channel estimator comprises:
    an adder for adding the first pilot symbol and the second pilot symbol.

4. The apparatus according to claim 1, wherein the first energy detector is configured to detect energy in each finger for a symbol output from the first channel estimator, and the second energy detector is configured to detect energy in each finger for a symbol output from the second channel estimator.

5. The apparatus according to claim 4, further comprising:
    a first combination unit for combining energy values in each finger detected by the first energy detector; and
    a second combination unit for combining energy values in each finger detected by the second energy detector.

6. The apparatus according to claim 1, wherein the first energy detector comprises a multiplier for multiplying an energy value detected by the first energy detector by an arbitrary coefficient so as to be substantially equal in distribution to an energy value detected by the second energy detector.

7. The apparatus according to claim 6, wherein the determination unit comprises:
    a calculator for calculating a decision matrix value to determine whether the secondary/auxiliary pilot signal is present using an energy value $E_{pri+aux}$ detected by the second energy detector and an energy value $E'_{pri}$ output from the multiplier; and
    a determination unit for comparing the decision matrix value calculated by the calculator with an established threshold value and determining whether the secondary/auxiliary pilot signal is present based on the comparison result.

8. The apparatus according to claim 7, wherein the decision matrix value calculated by the calculator is calculated using the following equation:

$$\text{decision matrix} = E_{pri+aux} - E'_{pri}$$

wherein $E_{pri+aux}$ is the energy value detected by the second energy detector, and $E'_{pri}$ is the energy value output from the multiplier.

9. The apparatus according to claim 7, wherein the determination unit is configured to:
    determine that the secondary/auxiliary pilot signal is present when the calculated decision matrix value is greater than the established threshold value; and
    determine that the secondary/auxiliary pilot signal is not present when the calculated decision matrix value is less than the established threshold value.

10. The apparatus according to claim 9, wherein the established threshold value is based on a power ratio and a noise component distribution of the secondary/auxiliary pilot signal and a primary pilot signal.

11. A method for detecting a pilot signal in a mobile communication system, comprising the steps of:
    estimating a first channel for a first pilot symbol and a second channel for a second pilot symbol;

detecting a first energy value for the first pilot symbol using a result value of the first channel estimation and a second energy value for the second pilot symbol using a result value of the second channel estimation; and determining whether a secondary/auxiliary pilot signal is present using each energy value detected.

12. The method according to claim 11, wherein the first pilot symbol is a primary pilot signal, and the second pilot symbol is a secondary/auxiliary pilot signal.

13. The method according to claim 11, wherein the second channel estimation step comprises the sub-step of:

adding the first pilot symbol and the second pilot symbol.

14. The method according to claim 11, wherein the energy value detection step comprises the sub-step of:

detecting energy values in each finger for symbols estimated from the first and second channels.

15. The method according to claim 13, wherein the energy value detection step further comprises the sub-step of:

combining the energy values in each finger for the symbols of the first and second channels in each channel.

16. The method according to claim 15, wherein the energy value detection step further comprises the sub-step of:

multiplying the detected first energy value by an arbitrary coefficient so as to be substantially equal in distribution to the detected second energy value.

17. The method according to claim 11, wherein the comparison and determination step comprises the sub-steps of:

calculating a decision matrix value to determine whether the secondary/auxiliary pilot signal is present using an energy value $E_{pri+aux}$ of the second channel and an energy value $E'_{pri}$ of a first channel energy value multiplied by an arbitrary coefficient; and comparing the calculated decision matrix value with an established threshold value and determining whether the secondary/auxiliary pilot signal is present based on the comparison result.

18. The method according to claim 17, wherein the calculated decision matrix value is calculated using the following equation:

$$\text{decision matrix} = E_{pri+aux} - E'_{pri}$$

wherein $E_{pri+aux}$ is the energy value of the second channel, and $E'_{pri}$ is the first channel energy value multiplied by the arbitrary coefficient.

19. The method according to claim 17, wherein the determination step comprises the sub-steps of:

determining that the secondary/auxiliary pilot signal is present when the calculated decision matrix value is greater than the established threshold value; and determining that the secondary/auxiliary pilot signal is not present when the calculated decision matrix value is less than the established threshold value.

20. The method according to claim 19, wherein the established threshold value is decided based on a power ratio and a noise component distribution of the secondary/auxiliary pilot signal and a primary pilot signal.

* * * * *